(No Model.)
J. LYONS.
APPARATUS FOR RECOVERING COPPERAS.
No. 304,333. Patented Sept. 2, 1884.
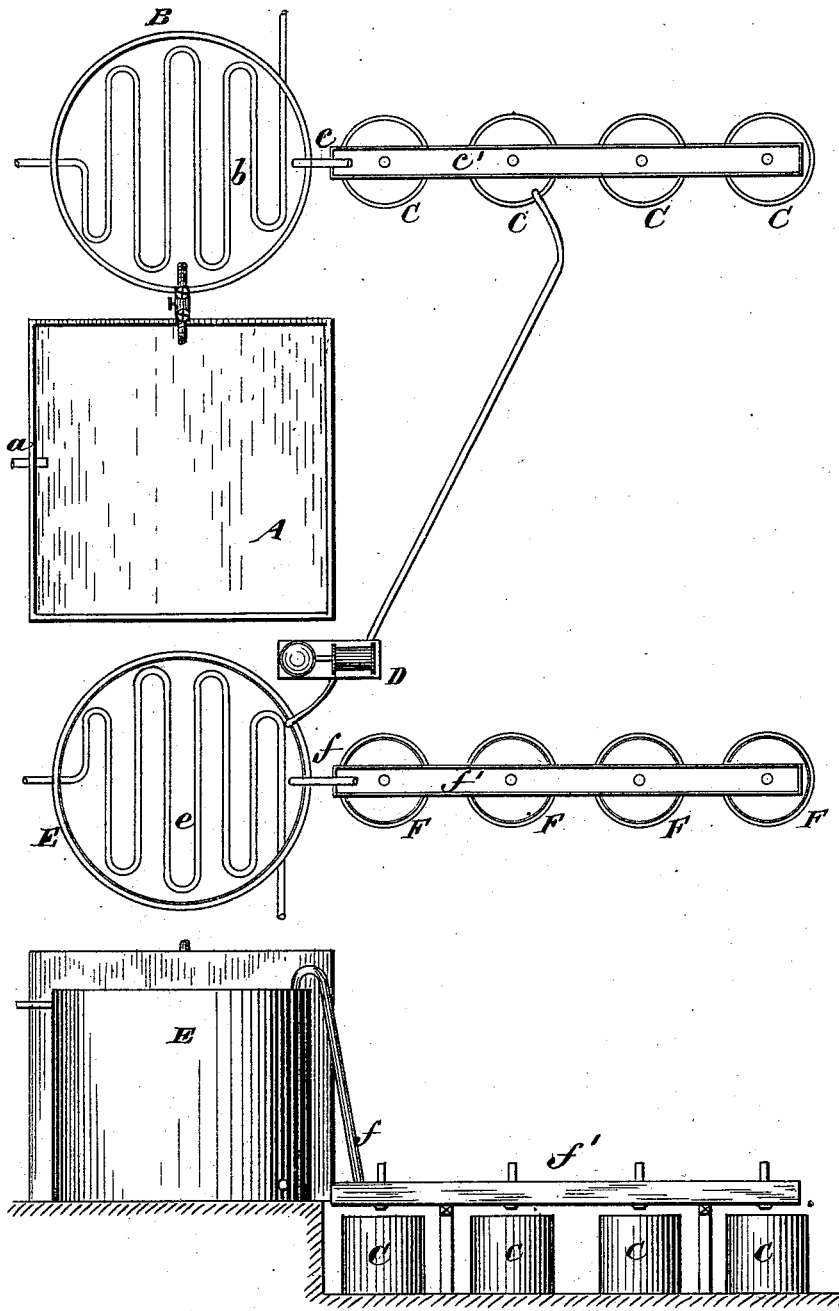

UNITED STATES PATENT OFFICE.

JEREMIAH LYONS, OF PITTSBURG, PENNSYLVANIA, ASSIGNOR OF ONE-HALF TO LENOX SIMPSON, OF SAME PLACE.

APPARATUS FOR RECOVERING COPPERAS.

SPECIFICATION forming part of Letters Patent No. 304,333, dated September 2, 1884.

Application filed May 16, 1884. (No model.)

*To all whom it may concern:*

Be it known that I, JEREMIAH LYONS, a subject of the Queen of Great Britain, residing at Pittsburg, in the county of Allegheny and State of Pennsylvania, have invented certain new and useful Improvements in Apparatus for Recovering Copperas and Sulphuric Acid from Waste Pickle, of which the following is a full, clear, and exact description.

In the manufacture of iron wire, in galvanizing sheet-iron, and in various other circumstances, the iron at different stages of its treatment is pickled, (i. e., subjected to the action of dilute sulphuric acid,) to remove the scale and cleanse the surface. The result of this pickling is that the sulphur and oxygen of the pickle unite with the oxide of iron as long as any of the sulphuric acid remains free. When the sulphuric acid has all united with its equivalent of iron oxide, the pickle is exhausted and useless. Ordinarily this exhausted pickle is allowed to flow off from the mill into the nearest stream, where it is not only lost, but poisons the stream for drinking purposes, kills the fish, and does damage of various kinds.

It is the object of this invention to utilize this waste pickle by abstracting from it both the iron and sulphuric acid. I attain this object by means of the process and apparatus hereinafter described.

The drawing represents a plan view of the apparatus employed.

A is a reservoir, into which the waste pickle is collected. From said reservoir the pickle is forced by a steam-injector, *a*, into a wooden tank or boiler, B. Steam-pipes *b*, distributed within the boiler, serve to heat the pickle to the boiling-point, and so keep it for the required time.

C are a series of wood vats or tubs, into which the boiled pickle is distributed by means of a lead siphon, *c*, and a wooden trough, *c'*, provided with vent-holes and plugs above each vat. A rubber pump, D, is provided, by means of which the liquid contents of the vats C may be forced into a second tank or boiler, E. Said tank E is lined with lead and provided with a steam heating pipe, *e*, by means of which the liquor is for a second time boiled. After being boiled the liquor is withdrawn from tank E into the series of lead-lined vats F by means of a lead siphon, *f*, and trough *f'*, the latter lined with lead, where it is for the second time allowed to cool.

The operation is as follows: The pickle is thoroughly boiled in tank B, and a portion of the water thereby evaporated, and then allowed to cool in vats C. As the boiled pickle cools, the copperas contained therein crystallizes and adheres to the internal surfaces of the vats. From thence the copperas is removed, and the residual liquor is pumped into tank E, where it is again thoroughly boiled. By this second boiling the water has been reduced to about fifty per cent., or less, of the whole mass. After the second boiling the liquor is conducted to the lead-lined vats F, and again allowed to cool. In this second cooling the remainder of the copperas crystallizes, and the liquid which remains is sulphuric acid of from forty to sixty degrees of strength. The copperas is removed and the sulphuric acid is placed in carboys, and is ready for use a second time in the pickling process. It will thus be seen that every part of the waste pickle is utilized, and that not a particle of refuse remains to be disposed of. It will further be seen that by the use of my apparatus the operation is made continuous—i. e., while a portion of the pickle is being boiled other portions are being cooled, and so on as long as any pickle remains.

Having thus described my invention, what I claim is—

1. The within-described apparatus, which consists, essentially, of a wooden tank, B, provided with a steam heating pipe, a series of wooden vats, C, a lead-lined tank, E, provided with a steam-pipe, a series of lead-lined vats, F, and means for distributing the liquor from tanks B and E into vats C and F, respectively, and for collecting the residual liquor from vats C into tank E, substantially as and for the purposes described.

2. The combination of boiler B, provided with steam-pipe *b*, siphon *c*, trough *c'*, provided with vent-holes and plugs, wooden vats C, pump D, boiler E, provided with pipe *e*, siphon *f*, and trough *f'*, and lead-lined vats F, all arranged and operated substantially in the manner described.

JEREMIAH LYONS.

Attest:
W. D. THOMAS,
J. A. KURTZ.